United States Patent [19]
Sasaki

[11] Patent Number: 5,328,119
[45] Date of Patent: Jul. 12, 1994

[54] TENSION REDUCER

[75] Inventor: Hironori Sasaki, Aichi, Japan

[73] Assignee: Kabushiki Kaisha Tokai-Rika-Denki-Seiskusho, Aichi, Japan

[21] Appl. No.: 25,237

[22] Filed: Mar. 2, 1993

[30] Foreign Application Priority Data

Mar. 2, 1992 [JP] Japan .................... 4-010156[U]

[51] Int. Cl.$^5$ .............................................. B60R 22/44
[52] U.S. Cl. .................................................... 242/372
[58] Field of Search ......... 242/107, 107.4 R, 107.4 A, 242/107.4 B; 280/806, 807

[56] References Cited

U.S. PATENT DOCUMENTS

| | | | |
|---|---|---|---|
| 4,483,494 | 11/1984 | Takada | 242/107 |
| 4,913,372 | 4/1990 | Takada | 242/107 |
| 4,989,804 | 2/1991 | Ebner et al. | 242/107 |
| 5,195,693 | 3/1993 | Sasaki et al. | 242/107 |

FOREIGN PATENT DOCUMENTS

| | | |
|---|---|---|
| 1-141147 | 6/1989 | Japan . |
| 2-256548 | 10/1990 | Japan . |
| 3-122968 | 12/1991 | Japan . |
| 3-122969 | 12/1991 | Japan . |

Primary Examiner—John M. Jillions
Attorney, Agent, or Firm—Fisher & Associates

[57] ABSTRACT

A tension reducer used in a webbing retractor is provided with a weak coil spring, a strong coil spring, and a connecting member all connected in series, the rotation of the connecting member in the webbing winding direction being stopped at a predetermined time after the webbing has been pulled out from the winding shaft when a passenger puts on the webbing. The inner end of the weak coil spring is connected to the connecting member so that, after the rotation of the connecting member has stopped, the urging force of the spring is released as the spring unwinds from its outer end.

4 Claims, 5 Drawing Sheets

TENSION REDUCER

BACKGROUND OF THE INVENTION

1. Field of the Invention

This invention concerns a tension reducer, and in particular, a tension reducer used in a webbing retractor for use in a seat belt system with which an automobile vehicle is equipped.

2. Related Art

This type of tension reducer (webbing retractor) comprises two types of flat coil springs, i.e. a strong (large) flat coil springs and a weak (small) flat coil spring. One end of the weak coil spring is attached to a winding shaft, and the other end is attached to one end of the strong coil spring via a gear spring. The other end of the strong coil spring is fastened to a case (cover). The winding shaft, weak coil spring, gear spring and strong coil spring are therefore connected in series, and the winding shaft is urged in the webbing winding direction by these flat coil springs. A pawl lever is disposed in the vicinity of the gear spring so as to interlock with the gear spring and thereby prevent its rotation. This pawl lever acts in synchronism with a solenoid or with the opening and closing of a car door.

After a passenger has put on the webbing, the pawl lever is operated by the aforesaid mechanism so as to prevent rotation of the gear spring. The urging force of the strong coil spring in the webbing winding direction therefore ceases to act on the winding shaft, the webbing is pulled only by the weak coil spring. Accordingly, the passenger does not feel constrained when he is wearing the webbing. When the passenger releases the webbing, the pawl lever no longer prevents the gear spring from rotating. The urging force of the strong coil spring in the webbing winding direction then acts on the winding shaft, which rapidly winds up the webbing.

In a webbing retractor provided with such a tension reducer, however, when all the webbing is wound, the coils of the weak coil spring 60 are in close contact with one another as shown in schematically in FIG. 5. After the webbing is drawn out and the tension reducer is operating, i.e. when the rotation of the gear spring connected to the outer end portion 62 of this weak coil spring 60 is prevented by means of the pawl lever, the urging force of the weak coil spring 60 in the webbing winding direction acts on the winding shaft when the coils of the spring are tightly wound, this urging force being released by the rotation of the shaft.

In this case, as the urging force of the weak coil spring 60 is released while an inner end 64 of the spring 60 connected to the winding shaft is winding out in the direction X shown in FIG. 5, adjacent side wall parts 66 in the vicinity of this inner end 64 rub against each other causing noise and impairment of operating performance due to friction.

SUMMARY OF THE INVENTION

In view of the aforesaid situation, it is an object of the present invention to provide a tension reducer wherein noise and friction are prevented and operating performance is improved when the tension reducer operates.

The tension reducer according to the present invention is used in a webbing retractor which winds a webbing in layers around a shaft. The tension reducer comprises a weak flat coil spring connected to this shaft, a strong flat coil spring exerting a larger urging force than the weak flat coil spring, and a connecting member connected in series with the weak coil spring and strong coil spring, the member being rotatable. The rotation of the tension reducer in the webbing winding direction is stopped at a predetermined time after the webbing has been pulled out from the winding shaft when a passenger puts the webbing on, and is characterized in that the outer end of the week coil spring is connected to the winding shaft, and the inner end of the weak coil spring is connected to the connecting member.

When a passenger has pulled out the webbing against the urging force of the strong and weak coil springs in order to put the webbing on, and the tension reducer having the aforesaid construction operates, the rotation of the connecting member in the webbing winding direction stops. The urging force of the strong coil spring in the webbing winding direction therefore ceases to act on the winding shaft, and the webbing is pulled back only by the weak coil spring. The passenger therefore does not feel constrained when he is wearing the webbing.

In the aforesaid case, when the tension reducer operates and the rotation of the connecting member in the webbing winding direction is stopped, the urging force in the webbing winding direction of the weak coil spring which has been wound by pulling out the webbing, acts on the winding shaft. The urging force is released by the rotation of the shaft.

As the outer end of the weak coil spring is connected to the winding shaft which is rotatable, and the inner end of the weak coil spring is connected to the connecting member whose rotation is stopped, the urging force of the weak coil spring is released as it unwinds from its outer end. Adjacent side walls of the weak coil spring therefore do not rub against each other, noise and friction are prevented, and operating performance is improved.

When the passenger releases the webbing and the tension reducer is released, the connecting member is again free to rotate in the webbing winding direction. The urging force of the strong coil spring in the webbing winding direction therefore again acts on the winding shaft via the connecting member and weak coil spring, and the webbing is rapidly wound by the strong coil spring.

DESCRIPTION OF THE PREFERRED EMBODIMENTS

Figure 1:
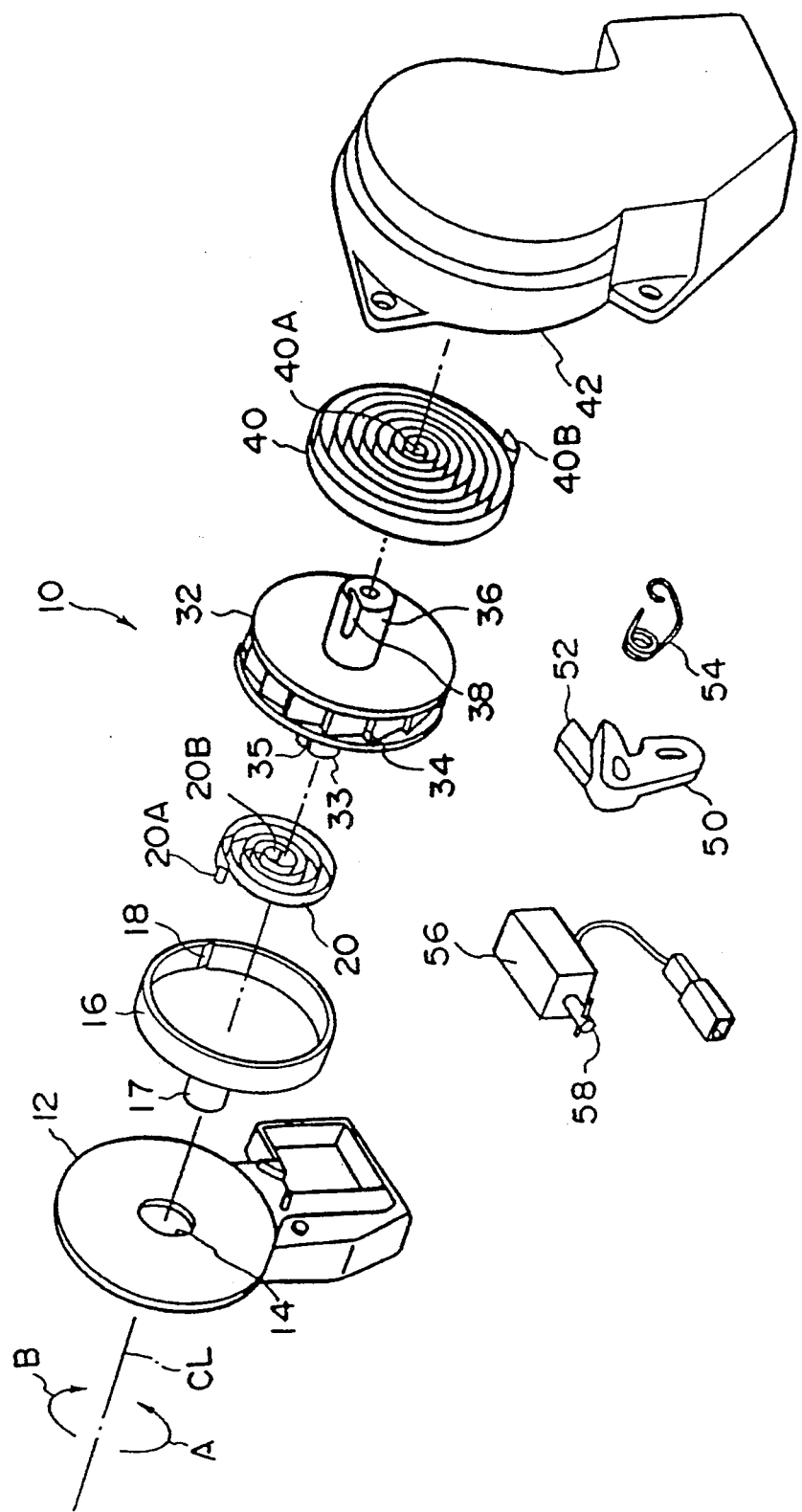
FIG. 1 is a perspective view of the component parts of a tension reducer according to this invention.
Figure 2:
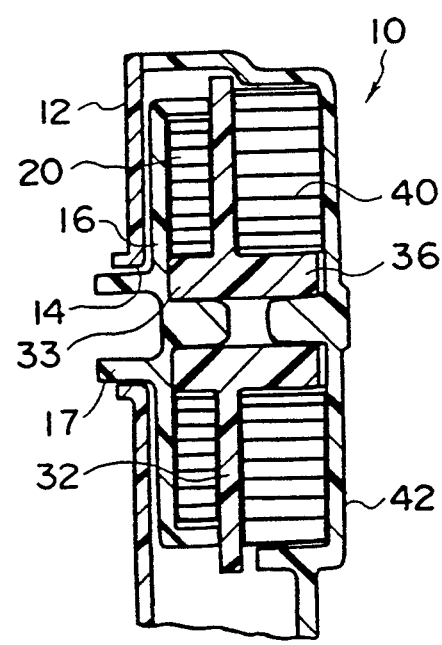
FIG. 2 is a section view of the main parts of a tension reducer.
Figure 3:
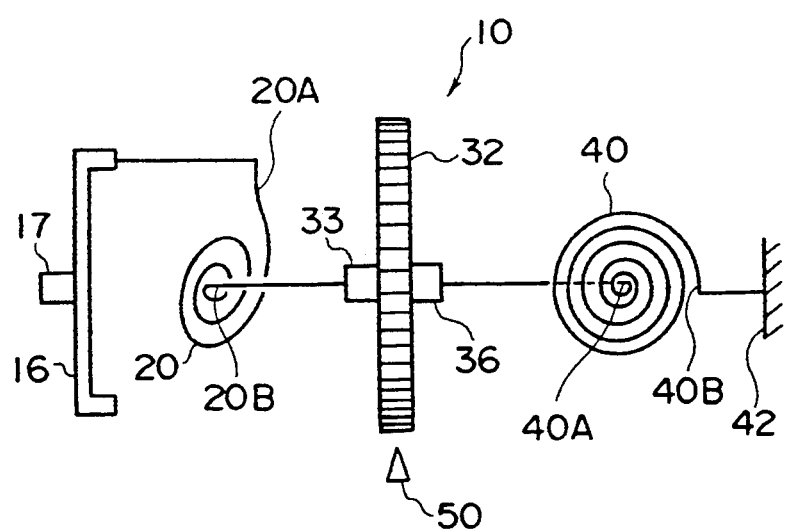
FIG. 3 is a schematic representation of a tension reducer as a model.

FIG. 1 shows a perspective view of the component parts of a tension reducer 10 according to this invention. FIG. 2 is a section view of the main parts of the tension reducer 10. FIG. 3 shows a schematic representation of the component parts of the tension reducer 10.

In the tension reducer 10, a plate 12 is attached to the frame of a webbing retractor, not shown, to which the tension reducer 10 is applied. A hole 14 is formed in the plate 12 coaxially with the webbing winding shaft (having an axis CL), this hole 14 supporting an adaptor 16.

The adaptor 16 is substantially circular, and has an axle portion 17 facing the plate 12. This axle portion 17 is inserted into the hole 14 of the plate 12 and is thereby supported such that it can rotate. The axle portion 17 is connected to the webbing winding shaft. The adaptor 16 therefore rotates together with the webbing winding shaft.

The adaptor 16 has a notch 18 in its inner wall circumference. An outer end 20A of a weak flat coil spring 20 engages the notch 18. An inner end 20B of the weak coil spring 20 engages a gear spring 32 which serves as a connecting member.

The gear spring 32 is in the form of a circular plate, and has ratchet teeth 34 formed on its outer circumference. An axle part 33 in a central portion of the gear spring 32 projects along the axis CL towards the adaptor 16. A notch 35 is cut in the shaft part 33 in the axial direction. The inner end 20B of the weak coil spring 20 engages this notch.

Another axle portion 36 is formed in a central portion of the gear spring 32 on the opposite side of the axle portion 33 along the axis CL. A notch 38 is cut in the axle portion 36 in the axial direction, and an inner end 40A of a strong flat coil spring 40 engages with this notch 38. An outer end 40B of the strong coil spring 40 is attached to a cover 42.

As shown in FIG. 3, the adapter 16, weak coil spring 20, gear spring 32 and strong coil spring 40 are connected in series. The adaptor 16 and a webbing winding shaft connected to the adaptor are urged in the webbing winding direction (direction B in FIG. 1) by these strong and weak coil springs.

A pawl lever 50, which acts as a means for stopping the rotation of the gear spring 32, is disposed such that it is free to pivot beneath the gear spring 32. A hook 52 is provided on the pawl lever 50 such that it can engage the ratchet teeth 34 of the gear spring 32. When the hook 52 engages the ratchet teeth 34, the rotation of the gear spring 32 in the webbing winding direction (direction B in FIG. 1) is prevented.

A return spring 54 is disposed near the pawl lever 50. This spring 54 urges the hook 52 of the pawl lever 50 to separate from the ratchet teeth 34. A solenoid 56 is also disposed near the pawl lever 50. An actuator 58 of the solenoid 56 is connected to the pawl lever 50. During operation, the pawl lever 50 pivots in opposition to the urging force of a return spring 54 so that the hook 52 engages the ratchet teeth 34. This solenoid 56 operates when a passenger puts on the webbing.

Next, the operation of the invention according to this embodiment will be described.

Figure 4A:
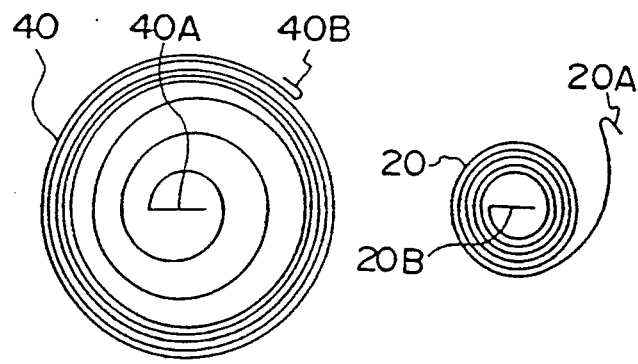
FIGS. 4A to 4C are schematic front views showing the state of a weak coil spring and a strong coil spring when a webbing is in different winding states.

In a tension reducer 10 having the aforesaid construction, before the passenger puts on the webbing, i.e. when the webbing is fully wound, the weak coil spring 20 is tightly wound and the strong coil spring 40 is unwound to the maximum as shown in FIG. 4A. The webbing can therefore be freely pulled out by rotating the adaptor 16 (winding shaft) in opposition to the urging force of the strong coil spring 40.

Figure 4B:
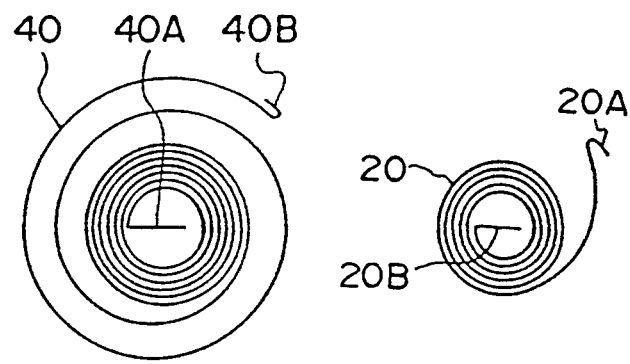
Figure 4C:
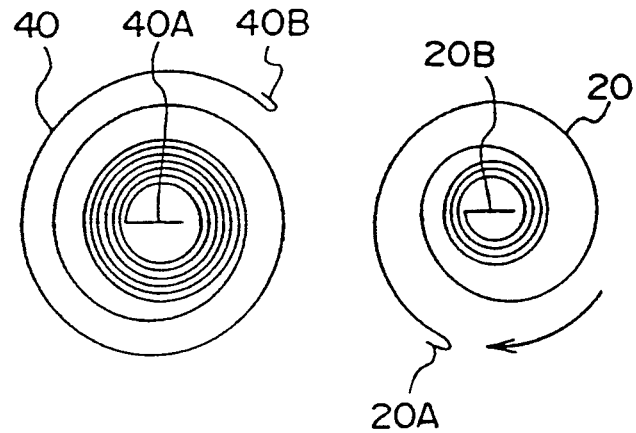
Figure 5:
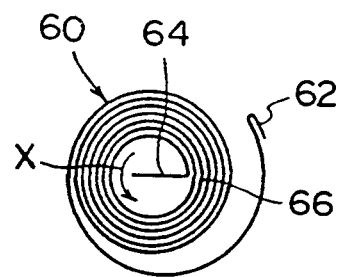
FIG. 5 is a schematic front view showing the state of a weak coil spring when a webbing is wound in a conventional tension reducer.

When the passenger puts on the webbing which has been pulled out, the solenoid 56 operates. When the solenoid 56 operates, the pawl lever 50 is pivoted by the movement of the actuator 58, the hook 52 engages with the ratchet teeth 34 of the gear spring 32, and the rotation of the gear spring 32 in the webbing winding direction is prevented. The strong coil spring 40 is thus held tightly wound as shown in FIG. 4C, the urging force of the strong coil spring 40 in the webbing winding direction no longer acts on the adaptor 16 and the webbing winding shaft connected to the adaptor 16, and the webbing is pulled only by the weak coil spring 20. The passenger can therefore wear the webbing without feeling constrained.

When the tension reducer is operated and the rotation of the gear spring 32 in the webbing winding direction is stopped, the urging force of the weak coil spring 20 which was tightly wound in the webbing winding direction acts on the adaptor 16 (winding shaft). When the winding shaft rotates, the urging force of the spring 20 is released.

As the outer end 20A of the weak coil spring 20 is connected to the adaptor 16 (winding shaft), i.e. the rotating side, and the inner end 20B of the weak coil spring 20 is connected to the gear spring 32, i.e. the side which was stopped from rotating, the urging force of the weak coil spring 20 is released as the spring is unwinding from its outer end 20A, as shown in FIG. 4C. Adjacent side walls of the weak coil spring 20 therefore do not rub against each other, noise and friction are prevented, and operating performance is improved.

When the tension reducer is operating, the webbing may also be pulled out against the urging force of the weak coil spring 20 alone. In this case the situation will alternate between that of FIG. 4B and FIG. 4C, and as the webbing winding shaft connected to the adaptor 16 can rotate freely, there is no interference with the pulling out of the webbing or with operating performance.

When the passenger releases the webbing and the solenoid 56 is turned off (release), the pawl lever 50 is pivoted by the urging force of the return spring 54, the hook 52 disengages from the ratchet teeth 34, and the gear spring 32 is again allowed to rotate. The urging force of the strong coil spring 40 in the webbing winding direction therefore acts on the webbing winding shaft via the gear spring 32, weak coil spring 30 and adaptor 16, and the webbing is wound rapidly by the large urging force of the strong coil spring 40. The strong coil spring 40 also returns to its maximum extension.

The tension reducer of this invention as described hereintofore therefore has the excellent features of no noise or friction, and improved operating performance.

What is claimed is:

1. A tension reducer used in a webbing retractor for winding webbing in layers on a winding shaft, said tension reducer comprising:

a weak flat coil spring having an urging force, said weak flat coil spring having an inner and outer ends, said outer end connected to said winding shaft, a strong flat coil spring having a greater urging force than said weak flat coil spring, a connecting member connected to said inner end of said weak flat coil spring, said connecting member being disposed between said weak flat coil spring and said strong flat coil spring so as to be connected in series with said weak flat coil spring and said strong flat coil spring, and said connecting member disposed such that it is rotatable, the rotation of said connecting member being in a webbing winding direction and being stopped at a predetermined point in time after said webbing has been drawn from said winding shaft when a passenger puts on said webbing, and said urging force of said weak flat coil spring being released as said weak flat coil spring unwinds from said outer end after the rotation of said connecting member has stopped, and a substantially cylindrical adapter having an axial portion connected to said winding shaft so that said adapter rotates together with said winding shaft, said outer end of said weak flat coil spring being connected to an outer circumference of said adaptor.

2. A tension reducer according to claim 1, wherein an inner wall of said adaptor has a notch, said notch being engaged with said outer end of said weak flat coil spring.

3. A tension reducer according to claim 1, wherein said connecting member is a circular plate, and said inner end of said weak flat coil spring being connected to an axial portion of said connecting member.

4. A tension reducer according to claim 3, wherein a projection having a notch is provided in an axial portion of said connecting member, and said inner end of said weak flat coil spring being engaged with said notch.

* * * * *